(12) United States Patent
Heinrich et al.

(10) Patent No.: US 11,073,379 B2
(45) Date of Patent: Jul. 27, 2021

(54) 3-D ENVIRONMENT SENSING BY MEANS OF PROJECTOR AND CAMERA MODULES

(71) Applicant: Conti Temic Microelectronic GmbH, Nuremberg (DE)

(72) Inventors: Stefan Heinrich, Achern (DE); Joachim Massen, Munich (DE); Dieter Krökel, Eriskirch (DE); Thomas Fechner, Wasserburg (DE)

(73) Assignee: Conti Temic Microelectronic GmbH

( * ) Notice: Subject to any disclaimer, the term of this patent is extended or adjusted under 35 U.S.C. 154(b) by 0 days.

(21) Appl. No.: 16/766,070

(22) PCT Filed: Oct. 19, 2018

(86) PCT No.: PCT/DE2018/200094
§ 371 (c)(1),
(2) Date: May 21, 2020

(87) PCT Pub. No.: WO2019/114889
PCT Pub. Date: Jun. 20, 2019

(65) Prior Publication Data
US 2020/0348127 A1   Nov. 5, 2020

(30) Foreign Application Priority Data

Dec. 14, 2017   (DE) ..................... 10 2017 222 708.7

(51) Int. Cl.
*G01B 11/25* (2006.01)
*H04N 13/239* (2018.01)
(Continued)

(52) U.S. Cl.
CPC ...... *G01B 11/2513* (2013.01); *G01B 11/2545* (2013.01); *G06T 7/70* (2017.01);
(Continued)

(58) Field of Classification Search
CPC ......... G06T 7/97; H04N 9/31; G03B 21/2033
See application file for complete search history.

(56) References Cited

U.S. PATENT DOCUMENTS 8,823,869 B2   9/2014   Beck
2003/0152290 A1   8/2003   Odell
(Continued)

FOREIGN PATENT DOCUMENTS

DE   19730414 A1   1/1999
DE   102010007396 A1   8/2011
(Continued)

OTHER PUBLICATIONS

Desardins, D., et al., "Dense Stereo Range Sensing with Marching Pseudo-Random Patterns," May 1, 2007, 8 pages, Computer and Robot Vision, Fourth Canadian Conference on Computer and Robot Vision (CRV'07).
(Continued)

*Primary Examiner* — Obafemi O Sosanya
(74) *Attorney, Agent, or Firm* — RatnerPrestia (57) ABSTRACT

A camera device for a vehicle for 3-D environment sensing includes at least two camera modules having at least partly overlapping sensing ranges, a camera control unit, an evaluation unit and a point light projector. The point light projector is arranged and configured in such a way that the point light projector projects a light pattern of measurement points into the vehicle environment. The at least two camera modules are arranged and configured in such a way that at least part of the projected light pattern is imaged in the overlapping sensing range. The evaluation unit is configured to determine the 3-D position of measurement points in the vehicle environment from image data captured with the at least two camera modules. The point light projector is configured to produce a series of "pseudo-noise patterns" as
(Continued)

the light pattern, the "pseudo-noise patterns" being projected into the vehicle environment in temporal succession.

9 Claims, 5 Drawing Sheets

(51) Int. Cl.
  *G06T 7/70* (2017.01)
  *H04N 13/254* (2018.01)
(52) U.S. Cl.
  CPC ......... *H04N 13/239* (2018.05); *H04N 13/254* (2018.05); *G06T 2207/30252* (2013.01)

(56) References Cited

U.S. PATENT DOCUMENTS

| | | | |
|---|---|---|---|
| 2009/0066929 A1 | 3/2009 | Tropf | |
| 2013/0100282 A1* | 4/2013 | Siercks | G01B 11/2513 348/135 |
| 2015/0241009 A1* | 8/2015 | Brendle | F21S 41/151 362/521 |

FOREIGN PATENT DOCUMENTS

| | | |
|---|---|---|
| DE | 102011121696 A1 | 6/2013 |
| DE | 102012207716 A1 | 11/2013 |
| DE | 202015105376 U1 | 10/2015 |
| DE | 10201508551 A1 | 1/2016 |
| EP | 3070641 A1 | 9/2016 |

OTHER PUBLICATIONS

German Search Report for German Application No. 10 2017 222 708.7, dated Jul. 25, 2018, with partial English translation, 9 pages.

International Search Report and Written Opinion for International Application No. PCT/DE2018/200094, dated Feb. 21, 2019, with partial English translation, 9 pages.

International Search Report and Written Opinion for International Application No. PCT/DE2018/200094, dated Feb. 21, 2019, 14 pages (German).

* cited by examiner

3-D ENVIRONMENT SENSING BY MEANS OF PROJECTOR AND CAMERA MODULES

CROSS REFERENCE TO RELATED APPLICATIONS

This application is the U.S. National Phase Application of PCT International Application No. PCT/DE2018/200094, filed Oct. 19, 2018, which claims priority to German Patent Application No. 10 2017 222 708.7, filed Dec. 14, 2017, the contents of such applications being incorporated by reference herein.

FIELD OF THE INVENTION

The invention relates to a camera device for a vehicle, which camera device ensures 3-D environment sensing, and a method for 3-D environment sensing by means of the camera device. The device and the method can be deployed in particular in the context of driver assistance systems.

BACKGROUND OF THE INVENTION

In order to detect objects in the vehicle environment, stereo cameras for 3-D environment sensing are deployed. The image information is correlated between the camera images in order to calculate the distance information.

One method which is frequently deployed in the vehicle environment in order to determine the distance from the correlation between stereo images is Semi-Global Matching (SGM).

The following problems can occur in connection with this:

In favorable light conditions (e.g. during the day), there is usually enough texture information to determine dense (image-filling) depth information in the video images. Therefore, daylight is usually sufficient for correlation analysis for stereo image processing.

However, in poor light conditions (e.g. at night), the stereo correlation methods (SGM) deployed quickly reach their limits despite the vehicle lighting. Due to the limited dark sensitivity of the imagers used, structures in the images of the video sensor technology cannot be correlated well enough at night.

Long exposure times have an additional, negative influence at night since, due to the motion blur in the video data, the structures required for the correlation can no longer be detected. A method for judging the condition of the roadway on which wheels of a motor vehicle are traveling in advance is known from DE 19730414 A1, incorporated herein by reference, wherein a laser light pattern sent out by a laser beam source is evaluated using the triangulation method.

In DE 202015105376 U1, incorporated herein by reference, a 3-D camera for capturing three-dimensional images from a monitoring region having an illumination unit for generating a structured illumination pattern in the monitoring region is described. In the 3-D camera, two camera modules are mounted at a known fixed distance from one another and each capture images of the monitoring region. An evaluation unit is designed to calculate a three-dimensional image from image data and to first produce a pre-scan of the monitoring region without a structured illumination pattern and to calculate a structured illumination pattern to be projected from the pre-scan and a desired structured illumination pattern in the monitoring region. The illumination unit is designed for real-time projection of a pixelized, quantized structured illumination pattern, and has a switchable LED or laser diode array.

DE 102015008551 A1, incorporated herein by reference, relates to a method for calibrating a camera unit of a motor vehicle. A predefinable pattern is projected into the surroundings of the motor vehicle by means of a headlamp of the motor vehicle. The predefinable pattern projected into the surroundings of the motor vehicle is optically sensed by means of the camera unit. The camera unit is automatically calibrated, taking into account the optically sensed pattern.

SUMMARY OF THE INVENTION

A solution is presented below, which ensures improved 3-D environment sensing.

A camera device according to an aspect of the invention for a vehicle comprises at least two camera modules having at least partly overlapping sensing ranges, a camera control unit, an evaluation unit and a point light projector. The point light projector is arranged and configured in such a way that the point light projector projects a light pattern of measurement points into the vehicle environment. The at least two camera modules are arranged and configured in such a way that at least part of the projected light pattern is imaged in the overlapping sensing range. The evaluation unit is configured to determine the 3-D position of measurement points in the vehicle environment from image data captured with the at least two camera modules. The point light projector is configured to produce a series of "pseudo-noise patterns" as the light pattern, the "pseudo-noise patterns" being projected into the vehicle environment in temporal succession (t0, t1, . . . tn).

The camera control unit is preferably configured to establish the temporal connection between the projection sequence and capturing the image sequence by means of the at least two camera modules. To this end, the camera control unit can transmit data to the point light projector and/or receive data from the point light projector. The camera control unit can optionally predefine synchronous capturing start times of the at least two camera modules. The terms "point light projector" and "measurement point" are not to be understood to mean that only circular points of light are provided as components of the light pattern. Rather, it is meant that flat regions can be illuminated with at least different intensity by the projector. A light pattern can for example consist of "holes" (negative marks/measurement points with otherwise uniform illumination). Light patterns made of intersecting lines, corners or chessboard patterns can also be used.

The camera control unit or respectively the evaluation unit can in particular comprise a microcontroller or processor, a Digital Signal Processor (DSP), an ASIC (Application Specific Integrated Circuit), a FPGA (Field Programmable Gate Array) and more of the same, and comprise software for performing the corresponding control or respectively evaluation steps. An aspect of the present invention can consequently be implemented in digital electronic circuits, computer hardware, firmware or software.

The subject-matter of an aspect of the invention is furthermore a method for spatial sensing of an environment of a vehicle by means of at least two camera modules having at least partly overlapping sensing ranges and a point light projector. The point light projector projects a light pattern of measurement points into the vehicle environment. At least part of the projected light pattern is imaged in the overlapping sensing range of the at least two camera modules. The 3-D position of measurement points in the vehicle environment is determined from image data captured with the at least two camera modules. A series of "pseudo-noise patterns", which are emitted into the vehicle environment in temporal succession (t0, t1, ... tn), is produced as a light pattern. The method can in particular be implemented in the form of software on a control unit or multiple control units or the evaluation unit of the camera device.

Further advantageous aspects are the subject-matter of the dependent claims. The content of the claims refers expressly to the content of the description. Further advantageous aspects are indicated below.

Light Pattern Consisting of Pseudo-Noise Series
  The point light pattern is not regular at any time.
  The projected light pattern consists of a series of "pseudo-noise patterns" which are radiated in a series in temporal succession (t0, t1, ... tn).
  Due to the temporal sequence of the "pseudo-noise patterns", each environmental position is occupied at least once by a measurement point of the light pattern within n time steps.
  The camera system can therefore determine 3-D measurement values uniformly distributed in every spatial direction.
  The point light patterns are in each case changed between the images captured by the stereo camera or respectively video sensor technology.

Length of Time of the Changing Point Light Projections
  The length of time during which the point light patterns are radiated is adapted to the exposure time of the video sensor technology so that the point light patterns are visible within the exposure phase of the video sensor technology.

Distance and Size of the Points of Light Adapted to the Size of the Correlation Masks of the Video Sensor Technology
  The spatial distance between the measurement points within the "pseudo-noise pattern" is adapted to the size of the correlation masks of the triangulation algorithmics of the stereo camera sensor.
  The angle between the radiated points of light corresponds to approximately twice the size of the patch correlators in the video image.
  The measurement points are not larger than ⅓ of the patch correlator size.

Calibration/Coupling of Camera and Point Light Projector
  In the case of the indicated method, a calibration between the camera system and the point light source is dispensed with.
  The 3-D measurement capability of the system is already completely provided by the stereo camera or multi camera.
  A triangulation between the light projector and the camera, as in the case of "traditional" structured light approaches, is not required with the present method.
  A mechanical coupling or calibration between the camera and the projector is therefore not necessary.

Direct Measurement of 3-D Position and Relative Speed
  Thanks to the "virtually static" assembly between the projector and the camera, the points of light are also captured free from motion blur even when the camera is moved.
  If, however, the distance from a measurement point alters during the exposure time, a linear distortion occurs in the video image at the respective light point in the stereo images.
  In the case of linearly distorted points of light, the relative speed of the measurement points is therefore directly established from the length of the line elements.
  Compared with traditional stereo and laser systems, a "direct" speed measurement is therefore possible, which can otherwise only be established via successive measurements and tracking.

Installation Independent of Direction of Travel
  The light pattern and the sensing of the measurement points can be effected in any direction on the vehicle.
  There is no dependence with regard to the direction of travel. The system can be installed on the rear of the vehicle or laterally.
  The point light projector can be installed behind the windshield or in the region of the headlamps.

Day/Night Mode=>Improved Eye Safety
  The system can be used in two operating modes depending on the ambient light.
  During the day, the stereo system works without the projected points of light. If there is sufficient ambient light, the stereo system establishes the 3-D measurements based on the visible structures in the video image.
  An "overexposure of sunlight" through the measurement points is not required with the method presented. This results in an advantage in terms of eye safety (fewer laser beams/less light can be radiated) compared with the "traditional" laser systems.
  The point light projector is used at night or in poor light conditions. However, due to the lower residual light (sunlight not present), less laser power is required here in order to achieve comparable ranges.

Pixel Light, Vehicle Headlamps
  The LED headlamps (pixel light) present on the vehicle can be used as the point light source.
  The point lights are changed in quick succession such that a uniform light distribution of a standard headlamp is produced for the driver.
  The points of light are temporally varied such that each region of the evaluation region is illuminated at least once within $\frac{1}{24}^{th}$ of a second.

Use of Invisible IR Light
  Light in the visible or invisible range can be used for the projection of the measurement points.
  If a point light source is used in the invisible infrared range, the ambient light is suppressed by an IR band-pass filter in the camera.

Compiling 3-D Depth Map from Points of Light
  A "complete" 3-D surroundings map is established by the system by superimposing the 3-D measurements from the 3-D point clouds of the stereo sensor or multi-camera sensor captured in temporal succession.
  The temporal superimposition of the measurements is effected e.g. by means of an Iterative Closest Point (ICP) algorithm.

Any Light Patterns
  Instead of the indicated light pattern (circular points of light), a pattern of points consisting of "holes" (negative marks/measurement points with otherwise uniform illumination) can also be used.
  Patterns from intersecting lines, corners or chessboard patterns can also be used.

Application with Multiple Sensors
  The points of light of the point light projector can be evaluated simultaneously by multiple sensors
  A temporal synchronization of the sensors among one another and with the point light projector is not required.

Instead of the stereo camera, a camera system consisting of multiple cameras can also be used in order to triangulate the 3-D measurement points.

Application with Multiple Point Light Projectors

The light point pattern can be composed of points of light from multiple point light projectors.

The projectors can be installed at various locations on the vehicle.

Installation Location Calibration

The camera system can perform an installation location calibration by projecting the points of light onto a planar surface.

The camera can be calibrated by the light pattern both when the vehicle is stopped and traveling.

It is possible to continually establish the installation location with respect to a planar surface (e.g. roadway surface).

Detection of Disturbances

Due to a continual monitoring of the point pattern, disturbances in the vehicle environment or in the optical path (e.g. due to contamination) can be detected.

A defect or a disturbance exists if, in a spatial direction, the points of light of the pattern are no longer detected.

The presence test (detection of all points of light) is performed as a self-test each time before the vehicle starts.

Advantages of the Presented Solution

Compared with traditional "structured light" approaches, no calibration between the point light source and the camera system is required with the proposed method.

No "motion blur" effect occurs in the video data, as the point light projection is not moving relative to the camera.

The method makes it possible to measure distances on untextured surfaces. The distance from the pattern points is also measured/triangulated on otherwise "uniform" surfaces.

Thanks to the "changing" light pattern, 3-D measurement values are possible in a uniform distribution in every spatial direction.

Compared with traditional stereo camera, multi-camera and laser systems, a "direct" speed measurement is possible.

Compared with the "traditional" systems, the method presented results in an increased range since, during the day, the visible structures are used to measure distances in the video images.

There is likewise an advantage in terms of eye safety since, compared with "traditional" systems, fewer laser beams/less light is/are radiated.

No "special" point light sources are required. The LED headlamps (pixel lights) already present on the vehicle can be used.

Further Possible Applications

Possible application for surround view cameras (surround view camera systems), i.e. laterally or behind the vehicle, in that multiple surround view cameras establish the 3-D position of the points of light by means of triangulation.

BRIEF DESCRIPTION OF THE DRAWINGS

Further features, advantages and effects of aspects of the invention are set out by the following description of preferred exemplary embodiments of the invention, wherein.

DETAILED DESCRIPTION OF THE PREFERRED EMBODIMENTS

Figure 1:
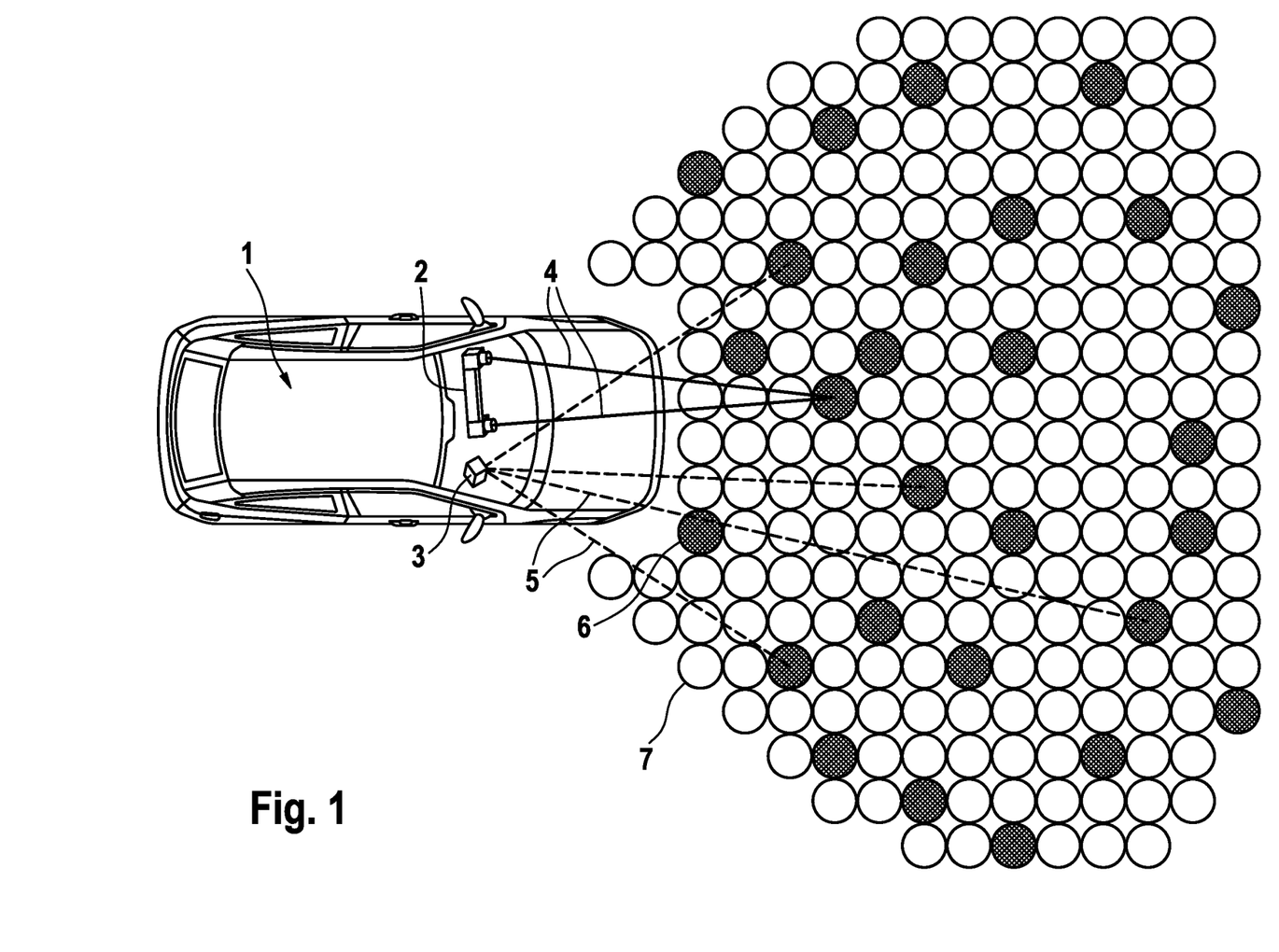
FIG. 1 schematically shows a projection of measurement points into the environment of a vehicle having a camera device.

According to an exemplary embodiment, a laser point light projector (3) is used together with a stereo camera (2) in order to improve the stereo performance especially at night. In FIG. 1, a vehicle (1) is represented, which has a stereo camera (2) looking in the direction of travel, e.g. in the region of the windshield of the vehicle (1). A point light projector (3) is fastened to a vehicle (1) such that its light pattern is projected into the vehicle environment. The point light projector (3) projects a pattern of illuminated measurement points (6), represented as black filled circles, onto the environment in front of the vehicle (1). The represented environment located in front of the vehicle (1) corresponds to a plane, e.g. a planar roadway surface. The projection beams (5) of individual activated light elements, e.g. LEDs or laser diodes of the point light projector (3), are schematically represented as dashed lines. Points (7) which are not illuminated at present by the point light projector (3) are illustrated as white circles. The two camera modules of the stereo camera (2) have an overlapping region, in which the sensing range of both camera modules overlap. Measurement points (6) which lie in said overlapping region are sensed by both camera modules. The sensing directions (4) of the two camera modules are represented schematically as solid lines in FIG. 1 for a measurement point.

Figure 2:
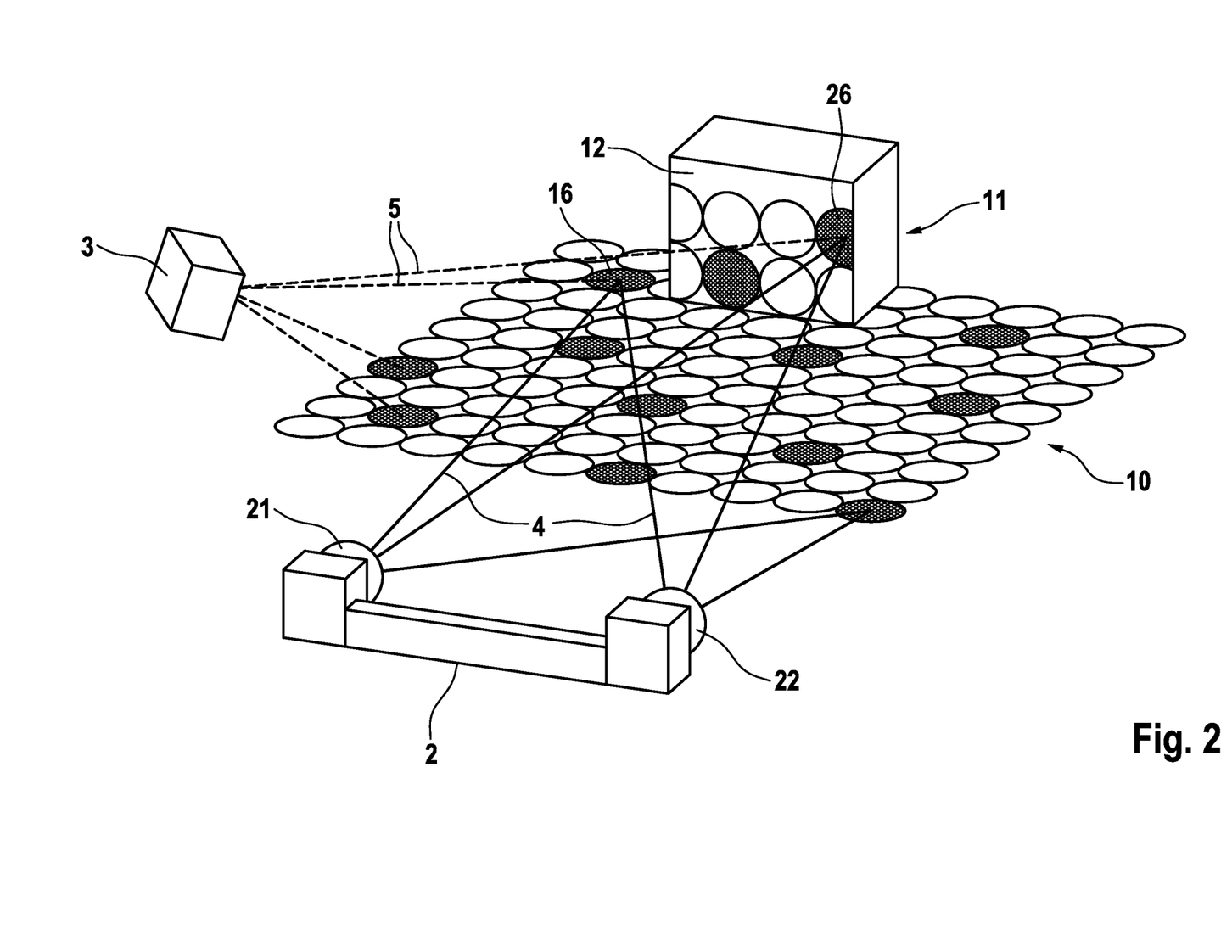
FIG. 2 schematically shows a 3-D triangulation of measurement points in the space.

It is illustrated in FIG. 2 how the 3-D positions of measurement points (16; 26) can be determined by triangulation. The stereo camera (2) comprises a first (21) and a second (22) camera module which are firmly connected to one another by a housing and have a defined base width (a lateral distance from one another). The point light projector (3) projects a pattern of illuminated measurement points (16, 26) onto the environment (10, 11). The environment comprises a planar surface (10) and an elevated cuboidal object (11). In the region of the planar surface, the point light projector (3) projects a pattern of illuminated first measurement points (16) and unilluminated surfaces (white circles) in a comparable manner to the situation in FIG. 1. On the side (12) of the elevated object (11) facing the point light projector (3), second measurement points (26) and unilluminated surfaces are projected. First and second measurement points (16, 26) are imaged by both camera modules (21, 22) of the stereo camera (2). The 3-D position of the vehicle environment (10, 11), which said measurement point (16, 26) illuminates, can be determined or respectively calculated in the inherently known way from the displacement (disparity) of a measurement point (16; 26) in simultaneously captured images of the first (21) and the second (2) camera module. Consequently, the 3-D environment can be reconstructed.

Figure 3:
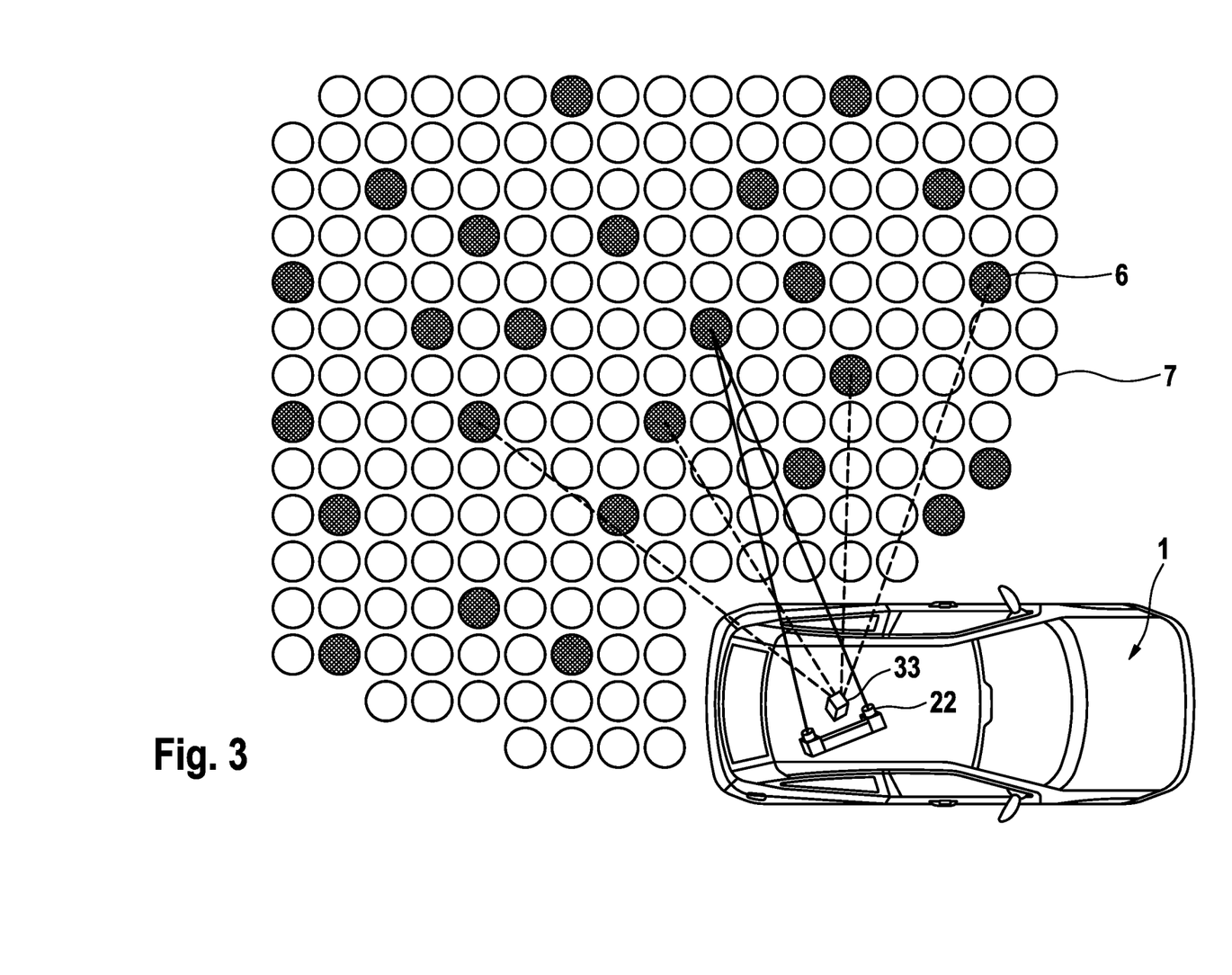
FIG. 3 schematically shows an arrangement of the point light projector and stereo camera, which is independent of the direction of travel.

An alternative arrangement of a stereo camera (22) and of a point light projector (33) on a vehicle (1) is schematically represented in FIG. 3. In this case, the left lateral and rearward environment of the vehicle (1) can be sensed or respectively established. The mode of operation corresponds to that previously explained for FIGS. 1 and 2.

Figure 4:
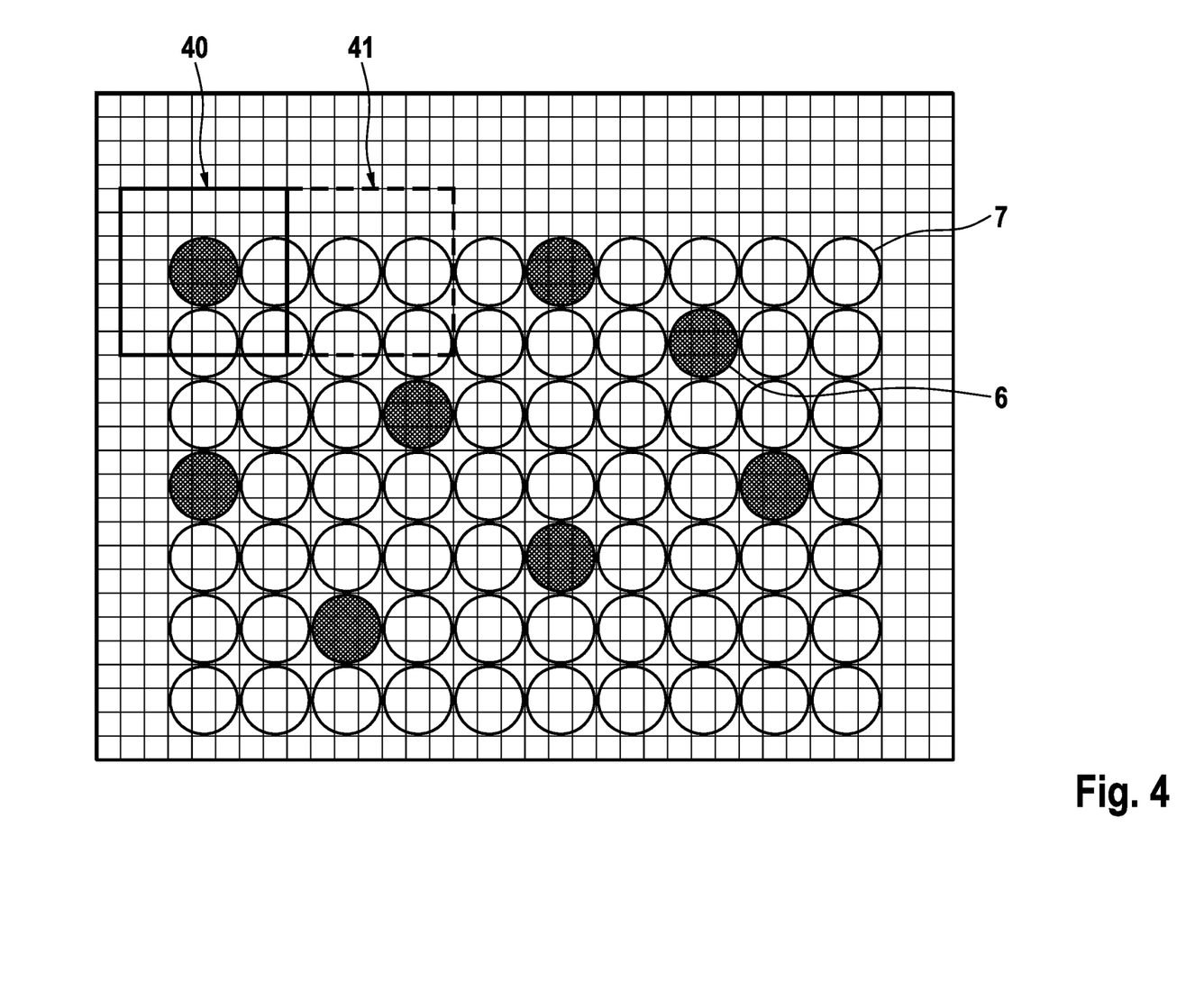
FIG. 4 schematically shows the distance of measurement points in the image plane of the camera device.

FIG. 4 schematically illustrates how the distance and size of the points of light can be adapted to the size of a correlation mask (40; 41) (patch correlator). Here, the distance between two neighboring points that can be illuminated by the projector is meant. The spatial distance between the measurement points within the "pseudo-noise pattern" is adapted to the size of the correlation masks (40; 41) of the triangulation algorithmics of the stereo camera sensor (2). The angle between the radiated points of light corresponds to approximately twice the size of the SGM patch correlators in the video image. The measurement points are not larger than ⅓ of the SGM patch correlator size.

Figure 5:
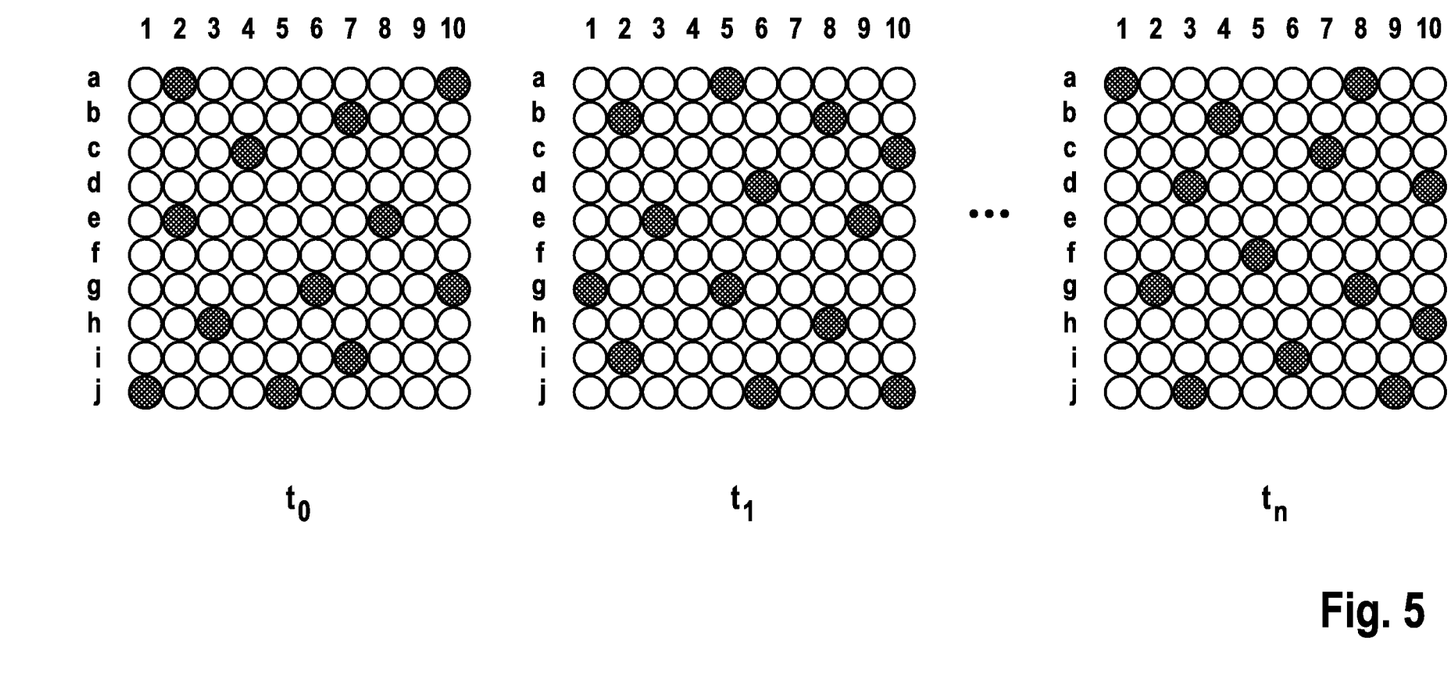
FIG. 5 schematically shows a temporal series of pseudo-noise patterns.

FIG. 5 schematically illustrates a series of n temporally varying pseudo-noise point light patterns. The point light pattern, that is to say the entirety of the surfaces illuminated (6) and not illuminated (7) by the point light projector (3), is not regular at any time, but fades away pseudo-randomly. The projected light pattern (6, 7) consists of a series of "pseudo-noise patterns" which are radiated or respectively projected into the vehicle environment at consecutive times $t_0, t_1, \ldots t_n$.

The patterns represented by way of example in FIG. 5 each comprise 10×10 points, numbered from a1 (top left) to j10 (bottom right). At time $t_0$, the points a2, a10, b7, c4, e2, e8, g6, g10, h3, i7, j1 and j5 are illuminated. At the following time $t_1$, the points a5, b2, b8, c10, d6, e3, g1, g5, h8, i2, j6 and j10 are illuminated. At time $t_n$, the points a1, a8, b4, c7, d3, d10, f5, g2, g8, h10, i6, j3 and j9 are illuminated.

Due to the temporal sequence of the "pseudo-noise patterns", each environmental position is occupied at least once by a measurement point of the light pattern within n time steps. The camera device can therefore determine 3-D measurement values uniformly distributed in every spatial direction, that is to say a 3-D points cloud. The point light pattern is in each case changed between the images captured by the camera modules. The length of time, during which the point light patterns are radiated, is adapted to the exposure time of the camera modules such that the point light patterns are visible within the exposure phase of the camera modules. A "complete" 3-D surroundings map is established by the system by superimposing the 3-D measurements from the 3-D point clouds of the stereo camera captured in temporal succession. The measurements are temporally superimposed e.g. by means of an Iterative Closest Point (ICP) algorithm.

The invention claimed is:

1. A camera device for a vehicle, comprising:
at least two camera modules having at least partly overlapping sensing ranges;
a camera control unit;
an evaluation unit; and
a point light projector,
the point light projector being arranged and configured in such a way that the point light projector projects a light pattern of measurement light points into an environment of the vehicle,
the at least two camera modules being arranged and configured in such a way that at least part of the projected light pattern is imaged in the overlapping sensing range,
the evaluation unit being configured to determine a 3-D position of measurement light points in the vehicle environment from image data captured with the at least two camera modules, and
the point light projector being configured to produce a series of "pseudo-noise patterns", which are projected into the vehicle environment in temporal succession, as the light pattern,
wherein the point light projector is configured to produce the series of "pseudo-noise patterns" in the temporal succession such that each environmental position located in the overlapping sensing range is illuminated at least once by one of the measurement light points of the light pattern within a predetermined period of time.

2. A camera device for a vehicle, comprising:
at least two camera modules having at least partly overlapping sensing ranges;
a camera control unit;
an evaluation unit; and
a point light projector,
the point light projector being arranged and configured in such a way that the point light projector projects a light pattern of measurement light points into an environment of the vehicle,
the at least two camera modules being arranged and configured in such a way that at least part of the projected light pattern is imaged in the overlapping sensing range,
the evaluation unit being configured to determine a 3-D position of measurement light points in the vehicle environment from image data captured with the at least two camera modules, and
the point light projector being configured to produce a series of "pseudo-noise patterns", which are projected into the vehicle environment in temporal succession, as the light pattern,
wherein the point light projector is configured to produce the series of "pseudo-noise patterns" using a predetermined distance between neighboring illuminable measurement light points of the light pattern, the predetermined distance based the size of a correlation mask used by the evaluation unit in order to determine the 3-D position from the captured image data.

3. The camera device according to claim 1, wherein headlamps of the vehicle are used as the point light projector, and wherein lighting elements of the headlamps are arranged in matrix form and are adapted for individual activation.

4. The camera device according to claim 3, wherein the headlamps are configured in such a way that the point lights are changed in quick succession such that a uniform light distribution of a standard headlamp is produced for the driver.

5. The camera device according to claim 1, wherein the evaluation unit is configured to determine a 3-D reconstruction of the vehicle environment by superimposing 3-D measurements from the measurement light points of the light pattern captured with the camera modules in temporal succession.

6. The camera device according to claim 1, wherein the two camera modules are rigidly connected to one another and are elements of a stereo camera with parallel optical axes.

7. The camera device according to claim 1, wherein the camera device is designed in such a way that at least two camera modules are fastened at different positions in or on the vehicle, as elements of a surround view camera system which provides an optical 360 degree sensing of the environment of the vehicle.

8. The camera device according to claim 1, wherein the camera device is configured to perform an installation location calibration of the camera modules by projecting the points of light onto a planar surface.

9. A method for spatial sensing of an environment of a vehicle by at least two camera modules having at least partly overlapping sensing ranges and a point light projector, the method comprising:
- projecting from the point light projector a light pattern of measurement light points into an environment of the vehicle,
- at least part of the projected light pattern being imaged in the overlapping sensing range of the at least two camera modules,
- determining the 3-D position of measurement light points in the vehicle environment from image data captured with the at least two camera modules, and
- a series of "pseudo-noise patterns", which are emitted into the vehicle environment in temporal succession, being produced as the light pattern,
- wherein the point light projector is configured to produce the series of "pseudo-noise patterns" in the temporal succession such that each environmental position located in the overlapping sensing range is illuminated at least once by one of the measurement light points of the light pattern within a predetermined period of time.

* * * * *